J. L. FEAGAN.
STALK CUTTER.
APPLICATION FILED MAR. 27, 1912.
1,032,748.
Patented July 16, 1912.
2 SHEETS—SHEET 1.
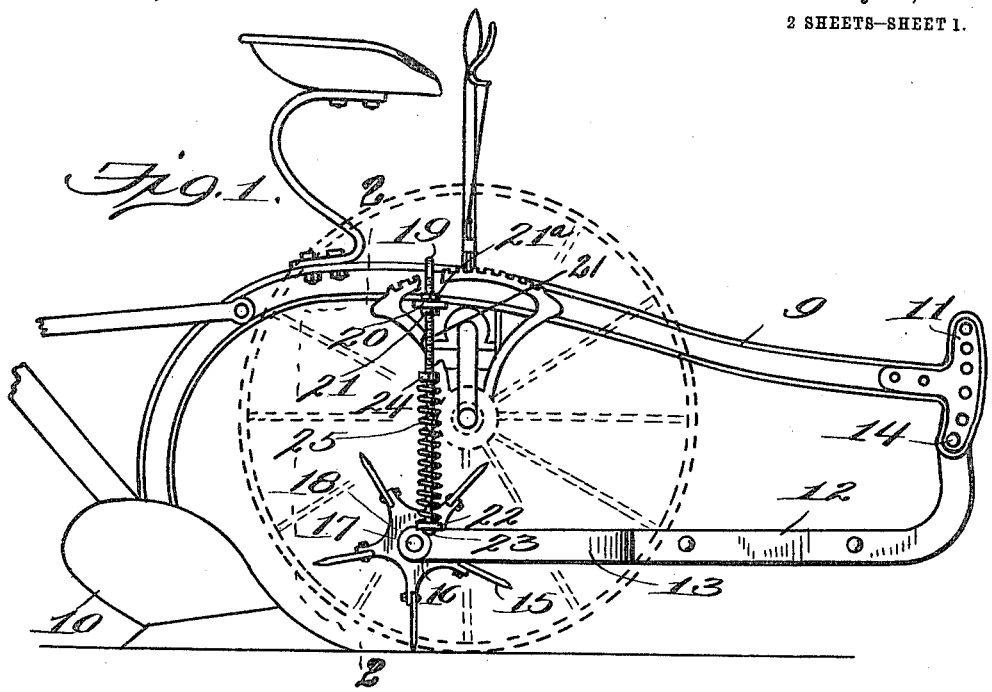
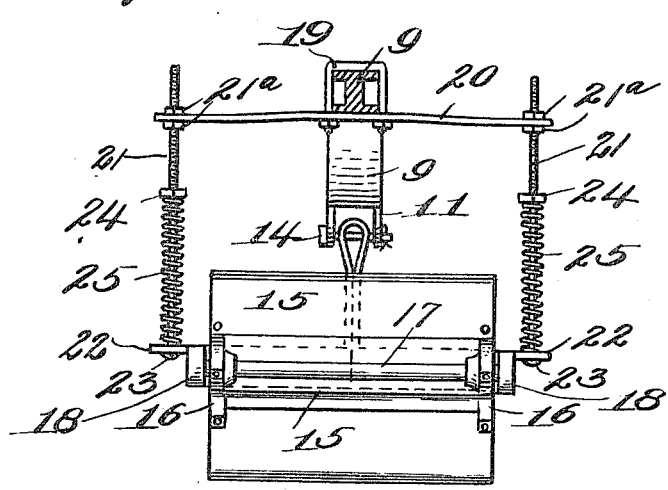
Witnesses:
Inventor
James L. Feagan
by

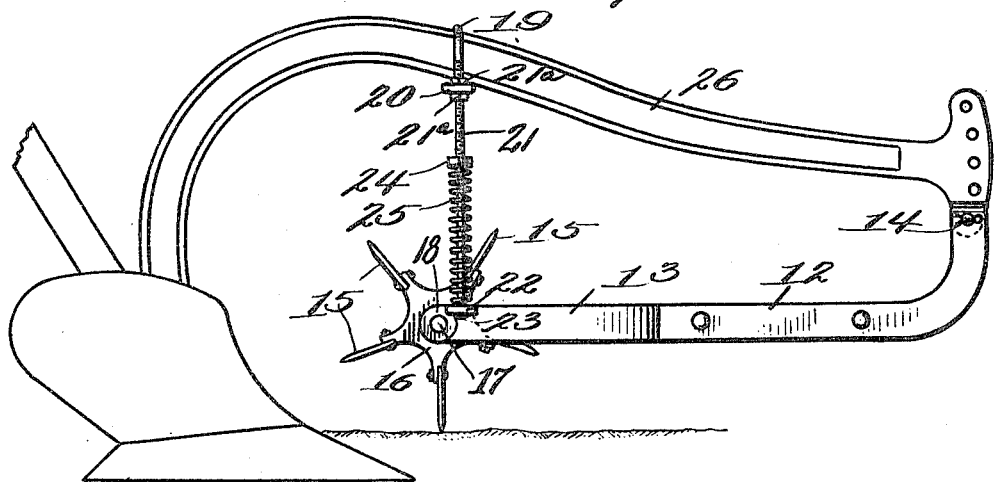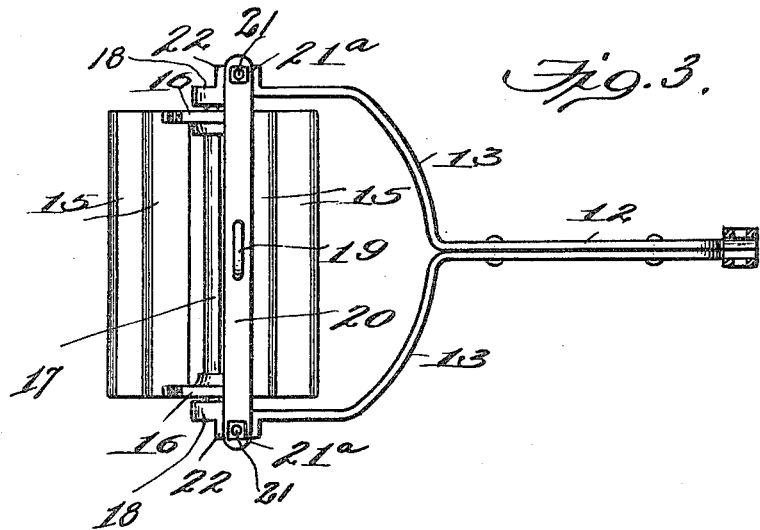

UNITED STATES PATENT OFFICE.

JAMES LEE FEAGAN, OF McCAULLEY, TEXAS.

STALK-CUTTER.

1,032,748. Specification of Letters Patent. Patented July 16, 1912.

Application filed March 27, 1912. Serial No. 686,636.

*To all whom it may concern:*

Be it known that I, JAMES L. FEAGAN, a citizen of the United States, residing at McCaulley, in the county of Fisher and State of Texas, have invented certain new and useful Improvements in Stalk-Cutters, of which the following is a specification.

The stalk cutter which is the subject of the present invention is designed for attachment to plows, it being mounted in advance of the plow share or shovel so that the cut stalks may be plowed under.

The invention has for its object to provide a simple and efficient stalk cutting mechanism which can be readily attached to any ordinary riding or walking plow, cultivator or similar implement, and to this end it consists in a novel combination and arrangement of parts to be hereinafter described and claimed.

In order that the invention may be better understood, reference is had to the accompanying drawings in which—

Figure 1 is a side elevation of a riding plow showing the stalk-cutting attachment applied thereto; Fig. 2 is a cross-section on the line 2—2 of Fig. 1; Fig. 3 is plan view of the attachment, and Fig. 4 is a side elevation showing the attachment applied to a walking plow.

Referring specifically to the drawings, and more particularly to Figs. 1 to 3, 9 denotes the beam of a riding plow, said beam carrying a plow shovel or share 10, and being equipped at its front end with a clevis 11 for attachment of the draft devices. An ordinary riding plow is illustrated, in view of which, a detailed description of the structure thereof is deemed unnecessary. The stalk-cutting attachment is carried by the beam 9 in advance of the shovel or share 10, and comprises the following parts: At 12 is indicated the shank of a fork, the two branches of which are shown at 13. The shank terminates in an upward bend which extends between the two members of the clevis 11 and has a transverse aperture to receive a pin 14 passing through said members, and thus securing the fork thereto. The pin passes loosely through the aperture so that a pivotal support for the fork is provided, and the latter is free to swing in a vertical plane. The fork branches extend rearward and carry the cutter, and as the fork is pivotally mounted at its front end, it will be evident that the cutter may swing up and down. The fork may be made in one piece by bending the same intermediate its ends and bringing the two ends together to form the shank, and then separating or spreading said ends to form the fork branches.

The cutter comprises a series of transverse blades 15 of suitable length, which are secured at their ends to radial arms on heads 16, said heads being rotatably mounted on a shaft 17 extending transversely between the fork branches 13, the latter being provided with suitable bearings 18 in which the shaft is supported.

The cutter is yieldingly held in working position by the following means: To the beam 9 is secured by a clip or other suitable means 19 a transverse bar 20 which projects from opposite sides of the beam. Each end of the bar carries a depending stem 21 which is rigidly fastened to the bar by nuts 21ª screwed on the stem above and below the bar. The stems pass at their lower ends through apertures in ears 22 on the fork branches and are provided with heads 23 below said ears, whereby the latter are prevented from slipping off the stems. Between the ears 22 and abutments 24 adjustably mounted on the stems, are interposed springs 25, said springs being coiled around the stems and serving to press that end of the fork which carries the cutter downward, so that the latter is yieldingly held in working position. The abutments 24 may be nuts which are screwed on the stems, and they are therefore adjustable to vary the tension of the springs.

Fig. 4 shows the attachment applied to an ordinary walking plow, it being mounted on the beam 26 thereof, in the same manner as that already described.

The attachment herein described is simple in construction, it can be easily put on or taken off the plow, and it effectually serves the purpose for which it is designed. The connection of the front end of the fork with the clevis of the plow beam enables the attachment to be readily adjusted up or down to suit the depth of the plow shovel or share.

I claim:

1. The combination with a plow beam and its clevis, of a fork pivotally connected to the clevis and extending rearward therefrom, a stalk cutter carried by the rear end of the fork, a cross-bar carried by the plow-beam, depending stems carried by the crossbar and loosely connected to the fork, and means carried by the stems for yieldingly holding the cutter in working position.

2. The combination with a plow beam and its clevis, of a fork pivotally connected to the clevis and extending rearward therefrom, a stalk cutter carried by the rear end of the fork, and a yielding support for the rear end of the fork carried by the plow beam.

3. The combination with a plow beam and its clevis, of a fork pivotally connected to the clevis and extending rearward therefrom, a stalk cutter carried by the rear end of the fork, a cross bar carried by the plow-beam, depending stems carried by the crossbar, ears extending from the fork branches to which ears the stems are loosely connected, abutments on the stems, and springs coiled around stems between the abutments and the ears.

In testimony whereof I affix my signature in presence of two witnesses.

JAMES LEE FEAGAN.

Witnesses:
J. S. PEAWELL,
C. T. CHEZ.